United States Patent Office 3,552,856
Patented Jan. 5, 1971

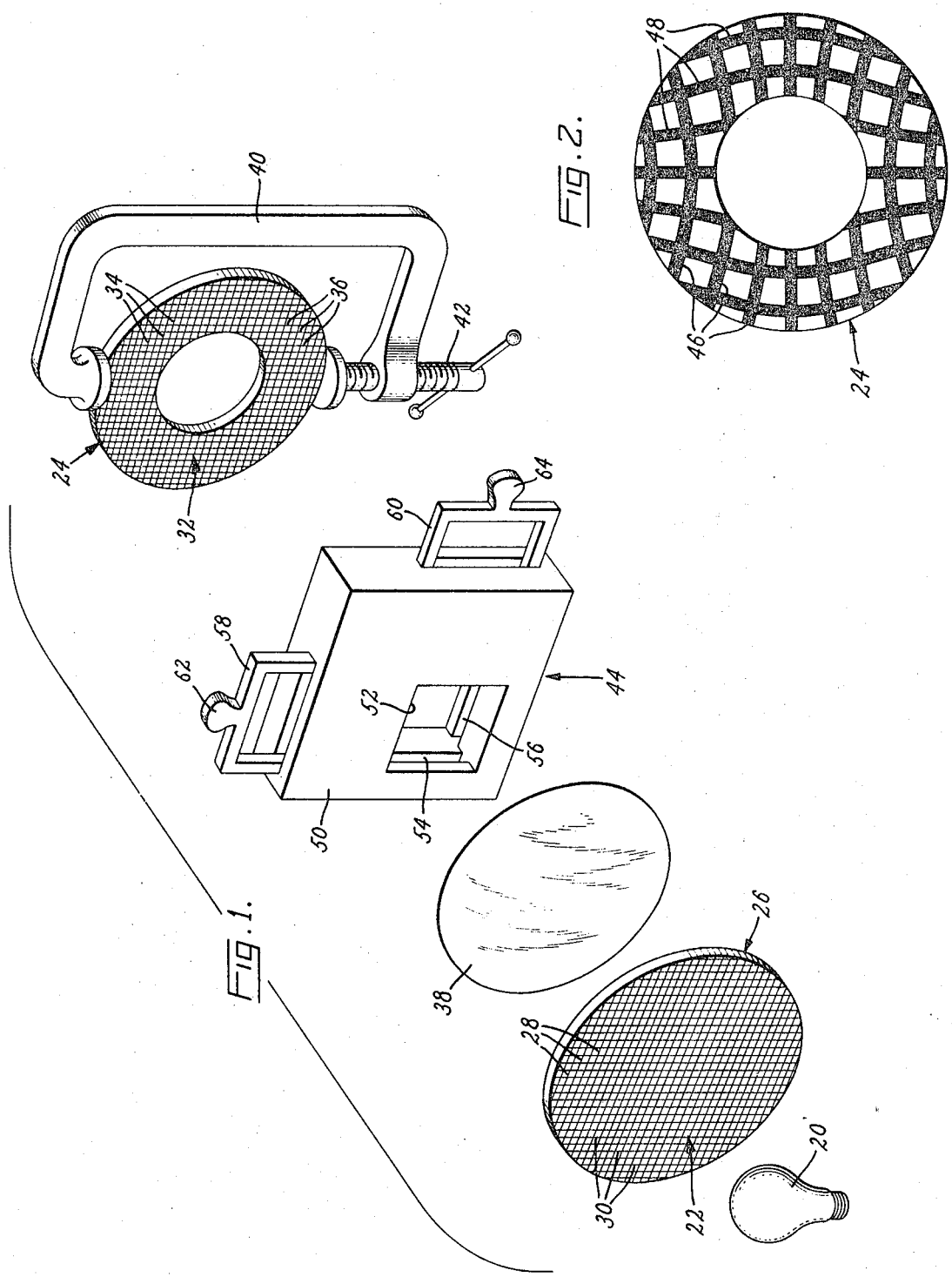

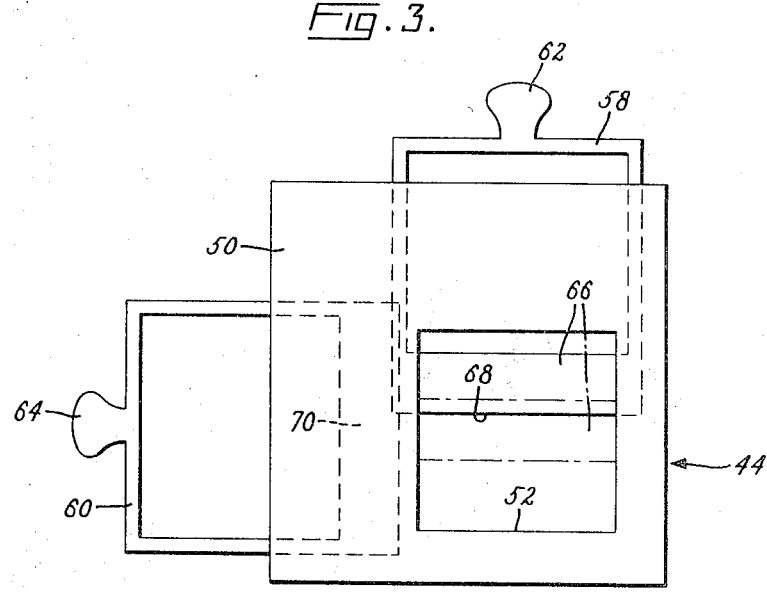
Fig. 3.
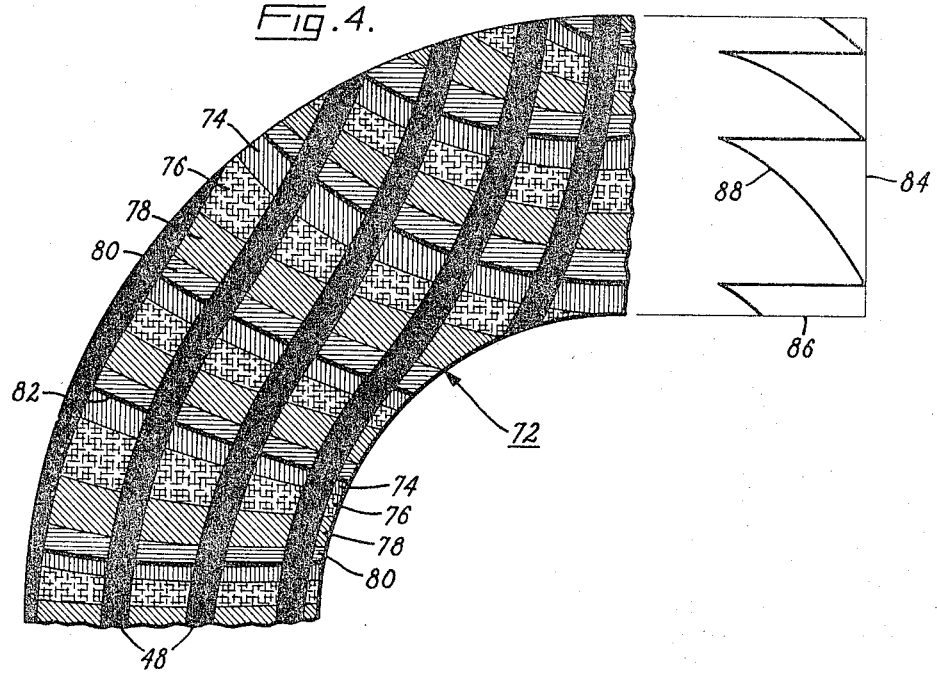
Fig. 4.
Fig. 4A.

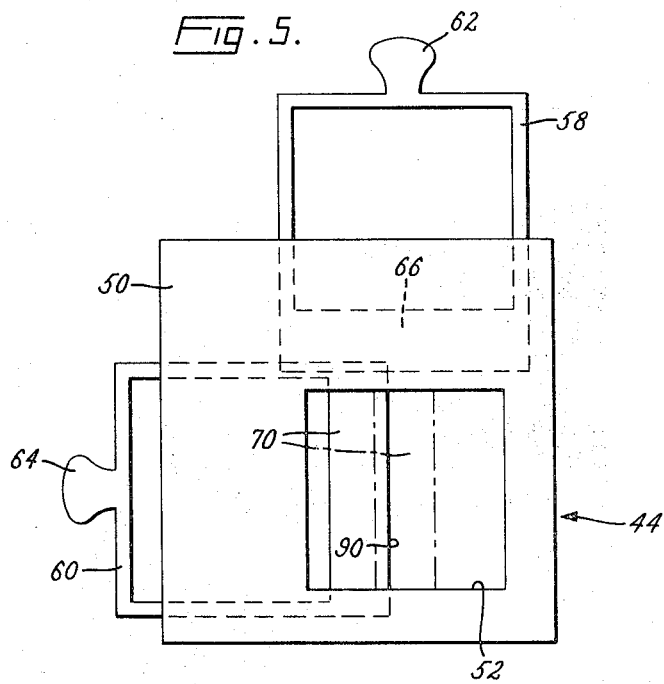
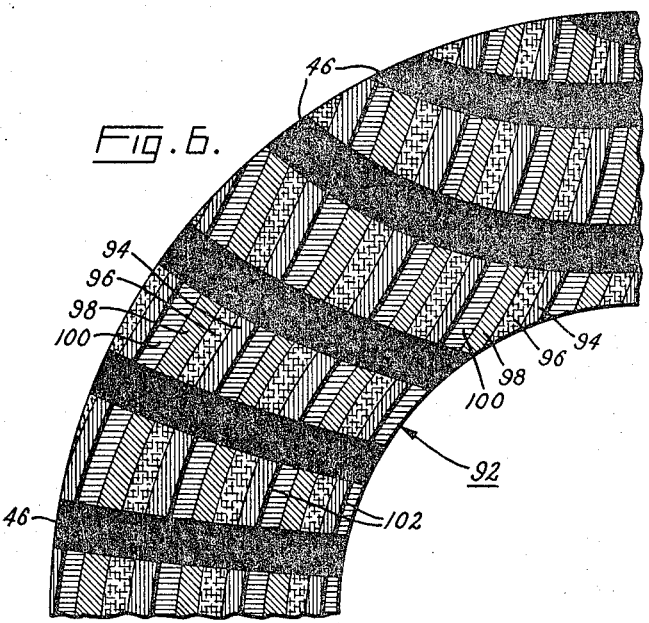
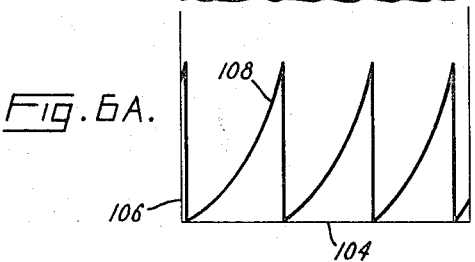

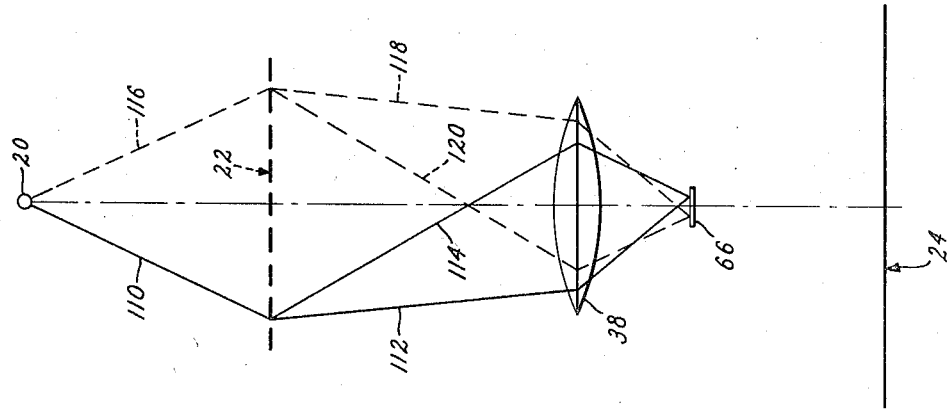
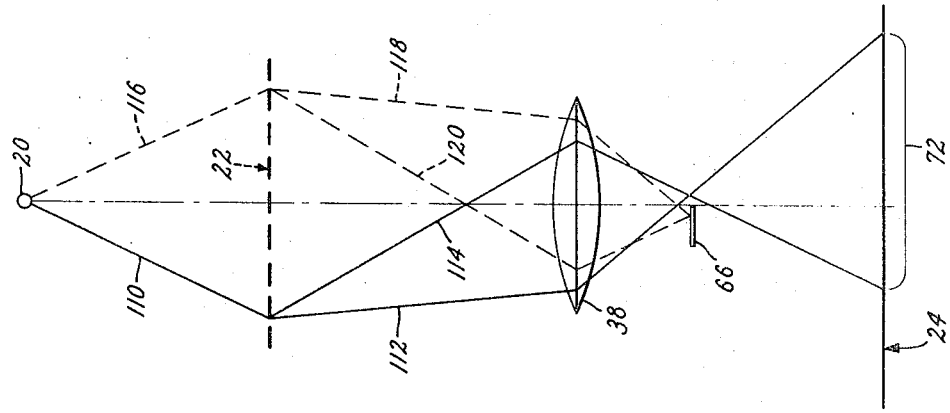
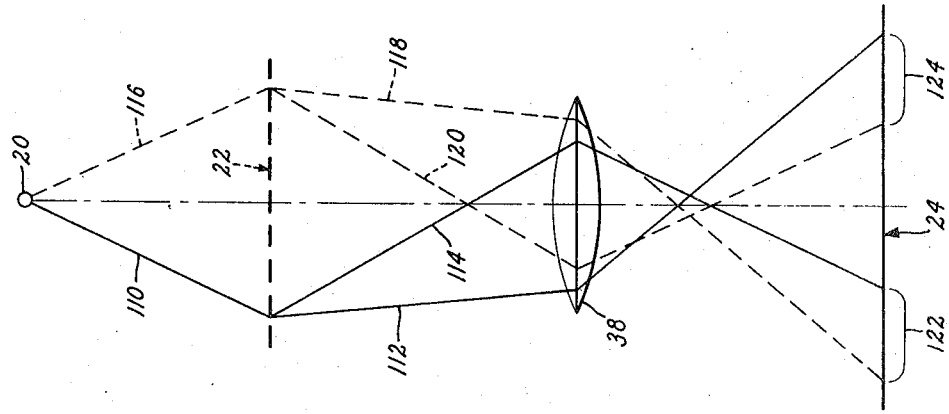

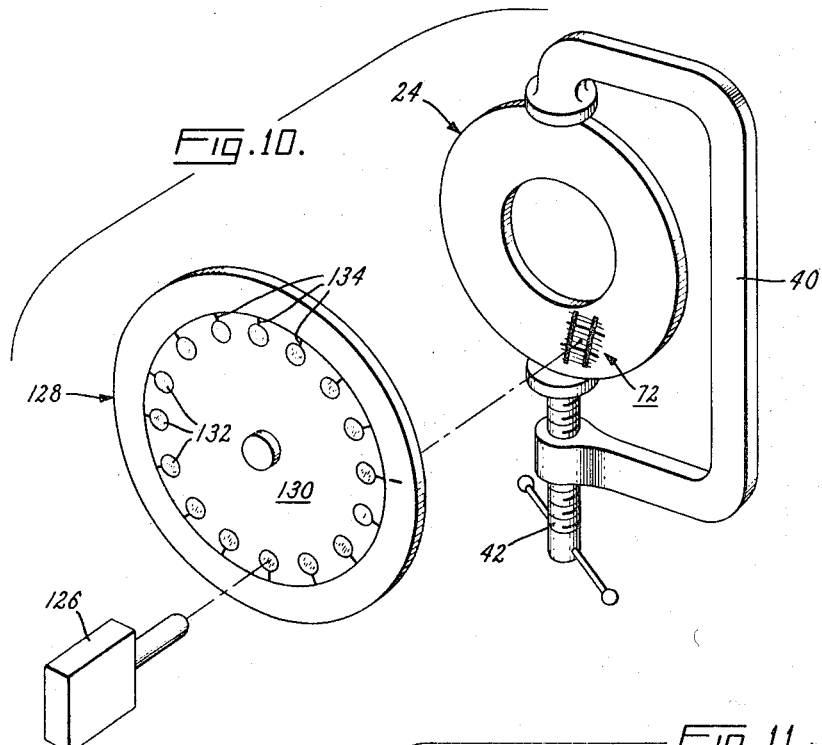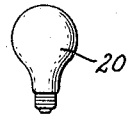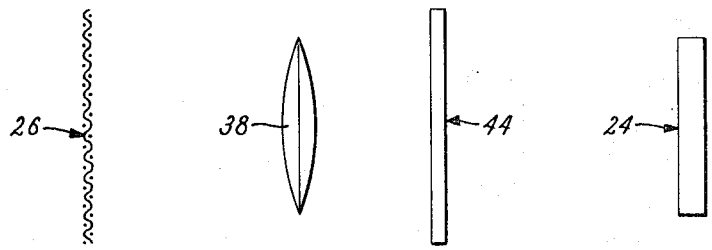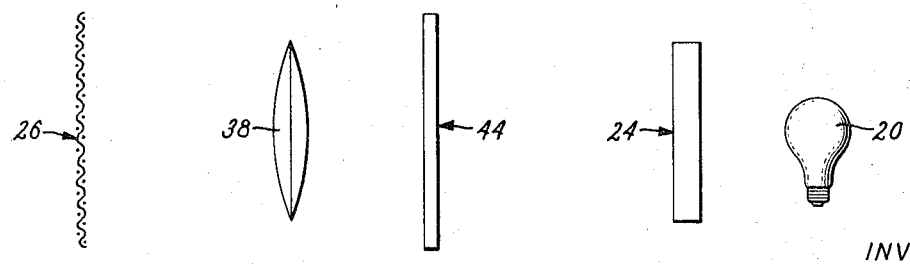

3,552,856
TECHNIQUE FOR ANALYZING DEFORMATION
IN A TEST SPECIMEN
Cletus R. Schwallie, Claymont, Del., assignor to The
Boeing Company, Seattle, Wash., a corporation of Delaware
Filed June 12, 1968, Ser. No. 736,434
Int. Cl. G01b 11/16
U.S. Cl. 356—32                                                18 Claims

ABSTRACT OF THE DISCLOSURE

Apparatus for analyzing deformation in a test specimen. When an image of a master grid is superposed on a congruent working grid of a test specimen or, conversely, the working grid is superposed on the master grid, and the specimen is deformed, successive fringes appear which are essentially parallel to the grid lines. A barrier in the form of an opaque element is positioned between the master grid and the specimen so as to obscure part of the image. In one position of the opaque element, one set of a resulting display of fringes appears as colors of a spectrum and the other set appears in black and white; in another position of the opaque element, only one set of fringes is apparent in black and white.

This invention relates generally to apparatus for analyzing deformation in a test specimen and specifically to improved apparatus employing the moiré effect.

A variety of devices have been employed in the past to determine distributions of deformation or strain in a test specimen. These devices have included, for example, electrical resistance type strain gauges which are limited in their usefulness in that while they provide an indication of strain at particular locations, they are unable to conveniently provide a comprehensive indication of strain, that is, the "strain field," in the specimen.

One technique which has been successful in displaying the strain field in a test specimen employs an optical phenomenon known as the moiré effect. The moiré effect is observed when one regular array of symbols, such as lines, is superposed on a second similar array. For normal test procedures, these arrays are often orthogonal straight lines initially of uniform pitch. One array, referred to as a master grid, is rigidly mounted on a transparent or translucent plate and is not subject to a change of pitch. The second array, referred to as a working grid, is mounted on the test specimen and is subject to a change of pitch as a function of the displacement field," that is, the sum of movements of all points, in the test specimen. The displacement field in the test specimen may be caused for example, by strain in the plane of the working grid.

In the absence of strain in the test specimen, the two superposed sets of grids are substantially matched and no fringes appear. However, when strain is introduced to the test specimen, the working grid is moved in proportion to the magnitude of the strain such that the lines of one grid become positioned to varying degrees between the lines of the other grid and thus introduce a pattern of alternating dark and light fringes. A dark fringe appears where a line of the working grid is displaced in a direction perpendicular to corresponding lines of the master grid by a distance equal to half the spacing of the master grid. In contrast, a light fringe, which in reality is the gap between dark fringes, appears where a line of the working grid is displaced by an integral multiple of the spacing of the master grid.

Beginning at an arbitrary "zero" fringe, successive fringes can be plotted against their location on the test specimen. Because a new fringe is generated only when the displacement field is equal to the initial pitch, or distance between two successive grid lines, it is possible to obtain a graph indicating displacement at any given location on the test specimen due to deformation versus the distance measured along a length of the test specimen. Thereupon, mathematical differentiation of a resulting displacement curve yields the strain field within the test specimen in the measured direction.

A primary drawback encountered when using conventional moiré techniques has been the inability to easily and accurately distinguish between X- and Y-fringes when viewed simultaneously. A situation in which it would be desirable to view X- and Y-fringes simultaneously arises, for example, when a test specimen is subjected to a strain which necessarily results in its destruction. In such an instance, it is difficult to successively view the individual X- and Y-fringes as the specimen is being destroyed and particularly at the very moment of its destruction.

Additional drawbacks of conventional moiré techniques were encountered when it was attempted to accurately measure the distance between a pair of fringes and to interpolate the displacement field between adjacent fringes. In order to measure between fringes, it is customary to locate the densest portion of each fringe and to use these portions as the respective limits of the measurement. Similarly, in order to interpolate, it is customary to locate a shade of gray which by reason of its density represents a certain percentage of the distance between fringes. In both instances, however, it has been found difficult to accurately locate the desired portions with the result that measurements were often inaccurate.

The present invention substantially avoids the foregoing difficulties in that it is possible to display the X- and Y-fringes simultaneously and in addition, either set of fringes can be seen as colors of a spectrum. To this end, it has been found that when a barrier in the form of an opaque element is suitably positioned between the master grid and the working grid on the specimen, part of the image of one grid superposed on the other grid is obscured and results in a pattern of X- and Y-fringes such that one set of fringes appears as colors of a spectrum while the other set appears in black and white. Specifically, when an edge of the opaque element is substantially parallel to the X-fringes, the X-fringes appear as colors of the spectrum and the Y-fringes appear in black and white and, conversely, when an edge of the opaque element is substantially parallel to the Y-fringes. With the fringes displayed as colors of the spectrum, it is possible to accurately interpolate between adjacent fringes and to obtain accurate measurements between a portion of one fringe represented by a particular color and a similar portion of another fringe represented by the same color.

Another feature of the invention resides in the ability to quickly and easily obscure, by means of the opaque element, an entire set of fringes, for example, the X-fringes, while viewing the other set of fringes, for example, the Y-fringes, in black and white. In this way, it is possible to obtain measurements with respect to one set of fringes, and then, immediately thereafter, obtain measurements with respect to the other set of fringes. Although the initial alignment of the master and working grids is a critical requirement as in conventional moiré techniques, the present invention does not require that the grids be subsequently moved and thereby disturb their mutual relationship. Rather, the desired result is obtained by suitably positioning an opaque bar having an edge substantially parallel to those lines of the grids whose fringes it is desired to obscure. Further, it is noteworthy that the positioning of the edge of the opaque bar relative to the grid lines in order to obtain the desired result is substantially less critical than the relative alignment required between the master and working grids.

Accordingly, a primary object of the invention is the provision of a new and improved technique for analyzing deformation in a test specimen.

Another object of the invention is the provision of new and improved apparatus for optically analyzing deformation in a test specimen.

Still another object of the invention is the provision of new and improved apparatus for deformation analysis which employs a moiré display in which fringes appear as colors of a spectrum. A related object of the invention is the provision of such apparatus which includes a pair of spaced indicia arrays, one of which is deformable relative to the other, an optical mechanism for superposing an image of one of the arrays onto the other of the arrays, and a barrier for obscuring part of the image such that remaining parts of the image superposed on the other of the arrays result in a display of fringes which appears as colors of a spectrum.

Yet another object of the invention is to provide new and improved apparatus for deformation analysis which includes an opaque element positioned between a master grid and a working grid and effective to obscure part of the image of one grid on the other grid such that one set of fringes appears as colors of a spectrum and the other set appears in black and white.

A further object of the invention is the provision of new and improved apparatus for obtaining moiré display in which one set of fringes is totally obscured and the other set is presented in black and white.

Other and further objects and advantages of the invention are obvious or will be presented in the description which follows, taken together with the accompanying drawings.

In the drawings:

FIG. 1 is a perspective view schematically representing a test arrangement which embodies the present invention;

FIG. 2 is a front elevation view of a test specimen under strain, as illustrated in FIG. 1, and indicating a display of conventional moiré fringes which occur in the absence of a barrier assembly;

FIG. 3 is a detail front elevation view of the barrier assembly illustrated in FIG. 1 and showing one position of its parts;

FIG. 4 is a detail front elevation view of a portion of the specimen shown in FIG. 2 and illustrating one display of fringes which results when the parts of the barrier assembly assume the positions indicated in FIG. 3;

FIG. 4A is a diagram associated with FIG. 4 and intended to indicate variations in the wave length of light cast upon the test specimen;

FIG. 5 is a detail front elevation view of the barrier assembly illustrated in FIG. 1 and showing another position of its parts;

FIG. 6 is a detail front elevation view similar to FIG. 4 but illustrating another display of fringes which results when the parts of the barrier assembly assume the positions indicated in FIG. 5;

FIG. 6A is a diagram similar to that shown in FIG. 4A but associated with FIG. 6;

FIGS. 7, 8, and 9 are successive diagrams schematically indicating the operation of the invention;

FIG. 10 is a schematic perspective view illustrating additional components adapted for use with the test arrangement illustrated in FIG. 1;

FIG. 11 is a side elevation view schematically representing a modified test arrangement; and FIG. 12 is a side elevation view schematically representing another modified test arrangement.

Refer now to the drawings and initially to FIG. 1 in which a white light source 20 is provided for illuminating a master grid 22 and for superposing an image of the master grid onto a test specimen 24. The master grid 22 is preferably an array of mutually transverse markings such as orthogonal opaque lines suitably provided on a translucent plate 26. The orthogonal lines of the master grid 22 are preferably composed of a set of uniformly spaced horizontal or Y-axis lines 28 and a set of uniformly spaced vertical or X-axis lines 30. Similarly, a working grid 32 is suitably provided on a plane of the test specimen 24 and includes a set of uniformly spaced horizontal or Y-axis lines 34 and a set of uniformly spaced vertical or X-axis lines 36.

The working grid 32 is substantially congruent with the master grid 22 when the test specimen 24 is in a relaxed or undeformed condition. In order to superpose an image of the master grid 22 onto the working grid 32 of the specimen 24, a suitable lens 38 is provided intermediate the plate 26 and the specimen 24 and renders a substantially 1:1 ratio of size of the master grid 22 to that of the working grid 32. In this manner, an image of the Y-axis lines 28 substantially coincides with the Y-axis lines 34 and an image of the X-axis lines 30 substantially coincides with the X-axis lines 36.

When employing a test arrangement as shown in FIG. 1, but absent a barrier assembly 44, fringes of the type indicated in FIG. 2 are displayed on a plane of the specimen 24 when a suitable clamping device 40 supporting the test specimen 24 imparts a strain in the specimen in response to rotation of a threaded handle 42. Specifically, a set of generally horizontal Y-fringes 46 appear because the Y-axis lines 34 are displaced relative to the Y-axis lines 28 and a set of generally vertical X-fringes 48 appear because the X-axis lines 36 are displaced relative to the X-axis lines 30. This results from the fact that the strain imparted to the test specimen 24 by the clamping device 40 causes a deformation of the test specimen and accordingly of the working grid 32 on a plane of the specimen. The simultaneous display of the Y-fringes 46 and of the X-fringes 48 illustrated in FIG. 2 is of a conventional nature in which the pitch or spacing between adjacent fringes is relatively coarse. However, in practice, it is often necessary to employ master and working grids having a relatively fine pitch in order to obtain more accurate strain information although it will be apparent that the finer the master and working grids, the greater the difficulty of distinguishing the Y-fringes 46 from the X-fringes 48.

To utilize the accuracy obtainable with a fine master grid 22 and a correspondingly fine working grid 32 while avoiding the difficulty of distinguishing between Y-fringes 46 and X-fringes 48, it has been found beneficial to display one set of fringes in black and white and simultaneously display the other set of fringes in colors of a spectrum. This can be accomplished by locating and suitably operating the barrier assembly 44, including a frame 50, intermediate the master grid 22 and the working grid 32. The frame 50 is provided with a window 52 situated so as normally to permit an image of the master grid 22 to be superposed on the working grid 32 and suitable spaced tracks 54 and 56 for guiding, respectively, a pair of movable slide members 58 and 60. The tracks 54 are preferably disposed to permit the slide member 58 to be displaced in a generally vertical direction with the aid of a handle 62 and the tracks 56 are preferably disposed to permit the slide member 60 to be displaced in a generally horizontal direction with the aid of a handle 64. When the slide member 58 and 60 assume the positions generally indicated in FIG. 3 such that an opaque bar 66 integral with the slide member 58 and having a substantially horizontal lower edge 68 covers a portion of an upper half of the window 52, a display of fringes results on a plane of the test specimen 24 as seen in FIG. 4. In this instance, an opaque bar 70 integral with the slide member 60 is in a position withdrawn from the window 52.

With reference to FIG. 4, a plurality of substantially horizontal Y-fringes 72 are evident and each of these fringes is divided into colors of a spectrum including a red region 74, a yellow region 76, a green region 78, and a blue region 80. Each Y-fringe 72 is separated from its neighboring Y-fringes by a distinct line of separation 82 or "tint of passage" which serves to enhance the accuracy of measurement by providing relatively sharp lines for measuring the distance betwen fringes. Coincident with the display of the colored Y-fringes 72, there is a display of the substantially vertical X-fringes 48 in black. Thus, with the slide members 58 and 60 assuming the positions indicated in FIG. 3, a simultaneous display of X- and Y-fringes 72 being in color, considerable accuracy of measurement is obtained.

In the FIG. 4A, a coordinate 84 represents distance along the test specimen 24 in a direction substantially perpendicular to the colored Y-fringes 72 and a coordinate 86 represents graduated wave lengths of light. A curve 88 indicates the manner in which the wave length of light constituting the Y-fringes 72 varies across each spectrum and graphically portrays the change in colors across each Y-fringe.

Similarly, when the slide members 58 and 60 assume positions generally indicated in FIG. 5 such that the opaque bar 70 having a lateral edge 90 partly obscures a left half of the window 52, a display of fringes results on a plane of the test specimen 24 as seen in FIG. 6. In this instance, the opaque bar 66 is in a position withdrawn from the window 52. In FIG. 6, a plurality of substantially vertical X-fringes 92 are evident and each of these fringes is divided into colors of a spectrum including a red region 94, a yellow region 96, a green region 98, and a blue region 100. Each X-fringe 92 is separated from its neighboring X-fringes by a distinct line of separation 102 or "tint of passage" which, as in the instance of FIG. 4, serves to enhance the accuracy of measurement by providing relatively sharp lines for measuring the distance between fringes. Coincident with the display of the colored X-fringes 92 is the display of the substantially horizontal Y-fringes 46 in black.

In FIG. 6A, a coordinate 104 represents distance along the test specimen 24 in a direction substantially perpendicular to the colored X-fringes 92 and a coordinate 106 represents graduated wave lengths of light. A curve 108 indicates the manner in which the wave length of light constituting the X-fringes 92 varies across each spectrum and graphically portrays the change in colors across each X-fringe.

From the foregoing, it will be apparent that movement of the opaque bar 66 has no effect on the X-fringes 48 but only on the colored Y-fringes 72 and similarly, that movement of the opaque bar 70 has no effect on the Y-fringes 46 but only on the colored X-fringes 92. Furthermore, when the opaque bar 66 is moved to a position as indicated by phantom lines in FIG. 3, the colored Y-fringes 72 disappear and only black X-fringes 48 remain displayed, and when opaque bar 70 is moved to a position as indicated by phantom lines in FIG. 5, the colored X-fringes 92 disappear and only the black Y-fringes 46 remain displayed. Of course, to assure this result, it is necessary that the opaque bars 66 and 70 be smaller than the beam of light projected from the source 20 at the place of interception and this can be achieved when the projected area of the bars 66 and 70 is less than that of the window 52. Thus, by reason of the invention, it is possible to provide a moiré fringe display in which one set of fringes appears in colors of a spectrum and its complementary set of fringes appears in black or, selectively, one set of fringes can be shown in black in the absence of its complementary set of fringes.

For a reasonable explanation of the preceding phenomena, reference is now made to FIGS. 7, 8, and 9. With particular reference first to FIG. 7, a ray 110 of white light from the source 20 is represented as passing through the master grid 22. For purposes of clarity, the master grid 22 is schematically shown as having one set of uniformly spaced lines in the absence of its complementary set of uniformly spaced lines, although in actual practice, both sets are present. The ray 110 is thereby separated into colors of a spectrum as defined by a pair of terminal beams 112 and 114 and is suitably focused by the lens 38 onto the test specimen 24. Likewise, a complementary ray of white light 116 from the source 20 is similarly separated, as it passes through the master grid 22, into colors of a spectrum as defined by a pair of terminal beams 118 and 120 and is focused by the lens 38 onto the test specimen 24. The spectrum resulting from the ray of light 116 substantially complements the spectrum resulting from the ray of light 110 and essentially white light is seen on a plane of the test specimen 24. It will be appreciated that offset regions 122 and 124 indicated in FIG. 7 and at which individual colors of the spectrum are apparent are exaggerated and that the spectrum resulting from the ray of light 116 in actuality substantially complements the spectrum resulting from the ray of light 110.

Refer now to FIG. 8 in which the opaque bar 66 is schematically shown in the position indicated by solid lines in FIG. 3. With the opaque bar 66 so positioned, all light originating with the ray 116 is blocked or prevented from striking the working grid 32 with the result that only the spectrum 72 defined between the terminal beams 112 and 114 and originating with the ray 110 is seen on the test specimen 24. The resultant display is that shown in FIG. 4. When the opaque bar 66 is moved to a position as indicated in FIG. 9 which corresponds to the position indicated by phantom lines in FIG. 3, it is seen that both of the rays 110 and 116 are totally blocked and prevented from striking the working grid 32. In addition, movement of the opaque bar 66 to either of the positions indicated in FIGS. 8 and 9, while affecting the Y-fringes 72 has no apparent effect on the X-fringes 46.

It is to be understood that the preceding description relating to movement of the opaque bar 66 to the positions indicated in FIGS. 8 and 9 and with reference to FIGS. 3 and 4 can also be ascribed to the opaque bar 70 with appropriate references to FIGS. 5 and 6.

With the colored displays obtained, as seen in FIGS. 4 and 6, it is possible to accurately measure the distance between fringes. This is particularly advantageous where the distance between fringes is substantial or where a high gradient of strain is present in the test specimen. To measure fractional fringes, and thereby interpolate the displacement field between adjacent fringes, suitable measuring apparatus such as that illustrated in FIG. 10 is provided. Specifically, a beam of white light from a variable intensity light source 126 is directed onto a particular region of the test specimen 24 and a light wheel 128 is suitably positioned between the light source 126 and the test specimen 24. The light wheel 128 includes a rotatable disc 130 having a plurality of tinted panes 132 mounted along and adjacent its outer peripheral edge. Each of the tinted panes 132 is of a slightly different color of the spectrum and the panes represent successively increasing (or decreasing) wave lengths as the disc 130 is rotated. The disc 130 is suitably rotated until one of the tinted panes 132 moves into the beam of light from the source 126 which is substantially similar to that color of the fringe, for example Y-fringe 72 on which the beam is directed. Graduations 134 are preferably provided around the edge of the disc 130 and correspond with each of the tinted panes 132 so as to indicate, for example, a location within a fringe as being a percentage of the total distance across the fringe. Thus, if the magnitude of the deformation in the test specimen 24 is known at the adjacent lines of separation which define the boundaries for the fringe in question, it is possible to accurately determine the deformation in the specimen at the location pinpointed by the beam of light from the light source 126.

Another embodiment of the test arrangement illustrated in FIG. 1 is presented schematically in FIG. 11 in which all of the components described above are included, but in which the light source 20 has been moved from a position co-linear with the plate 26 and with the test specimen 24 to a laterally disposed position. With this modified arrangement, an image of the working grid 32 appears on a plane of the plate 26 and if the light wheel 128 (not shown in FIG. 11) is used it is positioned between the light source 126 and the plate 26, but the results already described remain substantially unchanged.

Still another embodiment of the test arrangement is presented in FIG. 12. In this instance, the light source 20 is co-linear with the plate 26 and with the test specimen 24 but is located behind the test specimen 24. With this modified arrangement, the test specimen 24 must be translucent in order to permit illumination of the master grid 22 and of the working grid 32 and an image of the working grid 32 appears on a plane of the plate 26. As with the embodiment of FIG. 11, the embodiment of FIG. 12 affords results substantially unchanged from those obtained with the embodiment of FIG. 1, and if the light wheel 128 (not shown in FIG. 12) is used, it is positioned between the light source 126 and the plate 26.

Since many modifications and variations of the present invention are possible within the spirit of the instant disclosure, it is intended that the embodiments disclosed be deemed illustrative and not restrictive, reference being had to the following claims rather than to the specific description to indicate the scope of this invention.

What is claimed is:

1. Apparatus for analyzing deformation in a test specimen comprising:
   a pair of spaced lined diffracting means, one of said diffracting means being deformable in response to deformation in said test specimen,
   optical means for superposing an image of one of said diffracting means onto the other of said diffracting means, and
   opaque barrier means located between said pair of diffracting means for obscuring part of the image so that remaining parts of the image superposed on said other of said diffracting means result in a display of clearly distinguishable moiré fringes.

2. Apparatus as set forth in claim 1 wherein said pair of diffracting means includes master diffracting means spaced from the specimen and working diffracting means on a plane surface of the specimen, said working diffracting means being substantially congruent with said master diffracting means when the specimen is in a relaxed condition and being deformed relative to said master diffracting means when the specimen is in a strained condition.

3. Apparatus as set forth in claim 2 wherein said master diffracting means includes a member and a first array of diffracting symbols on a plane surface of said member and said working diffracting means includes a second array of diffracting symbols on a plane surface of the specimen and substantially congruent with said first array when the specimen is in a relaxed condition, said optical means superposing an image of said first array onto said second array and said opaque barrier means obscuring part of the image whereby remaining parts of the image superposed on said second array result in a display of moiré fringes which appears in successive colors of a spectrum.

4. Apparatus as set forth in claim 3 wherein said member is translucent.

5. Apparatus as set forth in claim 2 wherein said master diffracting means includes a member and a first array of diffracting symbols on a plane of said member and said working diffracting means includes a second array of diffracting symbols on a plane of the specimen and substantially congruent with said first array when the specimen is in a relaxed condition, said operative means superposing an image of said second array onto said first array and said opaque barrier means obscuring part of the image whereby remaining parts of the image superposed on said first array result in a display of fringes which appears in colors of a substantially complete spectrum.

6. Apparatus as set forth in claim 5 wherein said member is translucent.

7. Apparatus as set forth in claim 5 wherein said specimen is translucent.

8. Apparatus as set forth in claim 1 wherein said optical means includes a source of white light and a lens for projecting light from said source onto one of said diffracting means.

9. Apparatus as set forth in claim 1 wherein said opaque barrier means includes an opaque member positioned between said pair of diffracting means so that part of the image is obscured and part of the image is superposed on said other of said diffracting means and results in a display of moiré fringes which appears in colors of a substantially complete spectrum.

10. Apparatus as set forth in claim 1 wherein each of the fringes has a pair of spaced lines of separation defining limits of a plurality of successive colored regions and including projection means for directing a beam of light onto a selected one of the colored regions, and means for altering the color of the beam from said projection means to match the color of the selected color region.

11. Apparatus as set forth in claim 1 wherein each of the fringes has a pair of spaced lines of separation defining limits of a plurality of successive colored regions and including projection means for directing a beam of light onto a selected one of the colored regions, means for altering the color of the beam from said projection means to match the color of the selected color region, and means for measuring the distance from one of the spaced lines to the selected color region in a direction substantially perpendicular to said one spaced line.

12. Apparatus as set forth in claim 1 wherein each of said diffracting means includes a pair of spaced networks of markings, each network including one set of markings extending in one direction and another set of markings extending in a direction transverse to said one set, said optical means includes means for projecting a beam of light onto said one of said networks, and said opaque barrier means includes an opaque bar having an edge substantially parallel to said one set of markings for obscuring part of the image.

13. Apparatus as set forth in claim 1 wherein each of said diffracting means includes a pair of spaced networks of markings, each network including one set of markings extending in one direction and another set of markings extending in a direction transverse to said one set, said optical means includes means for projecting a beam of light onto said one of said networks, and said opaque barrier means includes an opaque bar for intercepting said beam of light and being smaller than said beam at the place of interception for completely obscuring said one set of markings so that an image of said other set of markings superposed on said other of said networks results in a display of moiré fringes extending generally parallel to said other set of markings.

14. Apparatus as set forth in claim 1 wherein each of said diffracting means includes a pair of spaced networks of markings, each network including one set of markings extending in one direction and another set of markings extending in a direction transverse to said one set, said optical means includes a means for projecting a beam of light onto said one of said networks, and said opaque barrier means includes an opaque bar having an edge substantially parallel to said one set of markings and movable from a withdrawn position to a first extended position to obscure part of the image.

15. Apparatus as set forth in claim 14 wherein said opaque bar is smaller than said beam of light and is movable to a second extended position for completely obscuring said one set of markings so that an image of said other set of markings superposed on said other of said networks results in a display of fringes extending generally parallel to said other set of markings.

16. Apparatus as set forth in claim 1 wherein each of said diffracting means includes one set of markings extending in one direction and another set of markings extending in a direction transverse to said one set of markings and said barrier means includes a first opaque bar having a first edge substantially parallel to said one set of markings and a second opaque bar having a second edge substantially parallel to said other set of markings, said first bar being movable in a direction transverse of said first edge from a withdrawn position to an extended position to obscure part of the image and said second bar being movable from a withdrawn position to an extended position to obscure part of the image.

17. Apparatus as set forth in claim 16 wherein said opaque barrier means includes a frame having a window therein to normally permit an image of one of said networks to be superposed on said other of said networks and tracks on said frame for guiding said first and second opaque bars between their withdrawn and extended positions.

18. Apparatus for analyzing deformation in a test specimen comprising:
- a pair of spaced networks of markings, each network including one set of markings extending in one direction and another set of markings extending in a direction transverse to said one set, one of said networks being deformable in response to a deformation in said test specimen,
- optical means for superposing an image of one of said networks onto the other of said networks,
- an opaque bar having an edge substantially parallel to said one set of markings and movable in a direction transverse to said edge from a withdrawn position to a first extended position for partially obscuring part of the image of one of said networks on the other of said networks so that remaining parts of the superposed image result in a display of fringes, each of which appears in colors of a spectrum, to a second extended position for completely obscuring said one set of markings so that an image of said other set of markings superposed on said other of said networks results in a display of moiré fringes extending generally parallel to said other set of markings, and
- means for guiding said opaque bar between said withdrawn position through said first extended position to said second extended position.

References Cited

UNITED STATES PATENTS

| | | | |
|---|---|---|---|
| 3,477,284 | 11/1969 | Schwallie et al. | |
| 3,488,512 | 1/1970 | La Roche. | |
| 2,694,804 | 11/1954 | Wagner | 356—169 |
| 2,720,810 | 10/1955 | Senn | 356—169 |
| 2,787,834 | 4/1957 | Shoup | 356—169 |
| 2,886,718 | 5/1959 | Shepherd et al. | 356—169 |
| 3,439,155 | 4/1969 | Alexander | 350—162 |

FOREIGN PATENTS

| | | | |
|---|---|---|---|
| 971,504 | 1964 | Great Britain | 356—169 |
| 1,012,283 | 1965 | Great Britain | 356—32 |

OTHER REFERENCES

Holister: "Moiré Method of Surface Strain Measurement," The Engineer, Jan. 27, 1967, vol. 223, pp. 149–152.

RONALD L. WIBERT, Primary Examiner

J. ROTHENBERG, Assistant Examiner

U.S. Cl. X.R.

73—88; 350—162; 356—169